(12) United States Patent
Won et al.

(10) Patent No.: US 8,040,455 B2
(45) Date of Patent: Oct. 18, 2011

(54) DISPLAY DEVICE AND INFORMATION PROCESSING DEVICE HAVING THE SAME

(75) Inventors: Joo-Yeon Won, Seoul (KR); Jae-Chang Choi, Yongin-si (KR); Sang-Soo Kim, Seoul (KR); Jung-Tae Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 85 days.

(21) Appl. No.: 12/265,222

(22) Filed: Nov. 5, 2008

(65) Prior Publication Data

US 2009/0122476 A1 May 14, 2009

(30) Foreign Application Priority Data

Nov. 8, 2007 (KR) .................. 10-2007-0113457

(51) Int. Cl.
*G02F 1/1333* (2006.01)
*G09F 13/08* (2006.01)
(52) U.S. Cl. .............. 349/58; 349/56; 349/61; 362/633; 362/97.2; 361/679.21
(58) Field of Classification Search .................... 349/58, 349/56, 61, 62, 116, 113, 122; 361/679.21; 362/633, 97.2
See application file for complete search history.

(56) References Cited

U.S. PATENT DOCUMENTS

| | | | | |
|---|---|---|---|---|
| 6,477,039 | B2 * | 11/2002 | Tajima | 361/679.21 |
| 6,559,829 | B1 * | 5/2003 | Matsuo et al. | 345/156 |
| 7,011,443 | B2 * | 3/2006 | Chen | 362/633 |
| 2001/0017673 | A1 | 8/2001 | Lee | 349/58 |
| 2001/0050732 | A1 | 12/2001 | Okamoto | 349/58 |
| 2004/0090567 | A1 | 5/2004 | Lee | 349/58 |
| 2004/0246397 | A1 | 12/2004 | Kang | 349/58 |
| 2005/0088809 | A1 * | 4/2005 | Nakagawa et al. | 361/681 |
| 2005/0110918 | A1 * | 5/2005 | Izawa | 349/58 |
| 2009/0122476 | A1 * | 5/2009 | Won et al. | 361/679.21 |

OTHER PUBLICATIONS

EP search report of Mar. 2, 2009.

* cited by examiner

*Primary Examiner* — Brian M Healy
(74) *Attorney, Agent, or Firm* — Innovation Counsel LLP

(57) ABSTRACT

A display device including a display module and an information processing device having the same is described herein. The display device includes a display module, a supporting frame, and a fixing frame. The supporting frame supports a rear face of the display module corresponding to a peripheral area, a side face of the display module, and includes a coupling portion used for connecting the fixing frame to an information input device. A rear housing receives the display device. A front housing is connected to the rear housing and has an opening to expose a display screen of the display module.

31 Claims, 7 Drawing Sheets

DISPLAY DEVICE AND INFORMATION PROCESSING DEVICE HAVING THE SAME

CROSS-REFERENCE TO RELATED APPLICATIONS

This application claims priority under 35 U.S.C. §119 to Korean Patent Application No. 10-2007-113457, filed on Nov. 8, 2007 in the Korean Intellectual Property Office (KIPO), the contents of which are incorporated herein by reference in their entirety.

BACKGROUND

1. Field of the Invention

The present invention relates to a display device and an information processing device having the display device. More particularly, the present invention relates to a flat panel display device having a novel frame structure and an information processing device having the display device.

2. Related Art

A flat panel display (FPD) device, for example, includes a liquid crystal display (LCD) device, a plasma display panel (PDP) device, an electroluminescent display (ELD) device, a vacuum fluorescent display (VFD) device, a light-emitting diode (LED) device, a field emission display (FED) device, etc.

The flat panel display device has many merits such as a slim size, low weight, and low power consumption. A thin-film transistor (TFT) LCD device displays an image with high quality, and has been developed to provide image display quality substantially equivalent to a cathode ray tube (CRT) device. The LCD device is widely used, and PDP devices are also used in various fields.

FPD devices are classified into categories such as an active-type light-emitting display device and a passive-type light-receiving display device based on the type of light source. In a light-receiving display device, a display panel and a light source part are assembled into a module using a member such as a mold frame connecting the display panel to the light source part or a chassis.

For example, an LCD module such as a monitor of a notebook computer includes a backlight disposed on a rear face of a liquid crystal panel, and the backlight includes frames such as a receiving mold frame or a metal back cover. The liquid crystal panel and the backlight part are then assembled into the LCD module using another frame such as a top chassis.

When an information processing device such as the notebook computer or a wall-hanging television receiver set includes the LCD module, the information processing device may include the LCD panel, brackets, and a cover. The cover is a housing that covers the LCD panel. The LCD panel is fixed to the cover, and covered and protected by the frames such as the brackets.

In the assembly structure mentioned above, the LCD module is assembled using frames such as the back cover, and the top chassis, while the information processing device is assembled using another frame such as the bracket. Thus, the number of elements used in the information processing device is increased. Also, the volume and weight of the information processing device may be increased, and assembly efficiency may be decreased.

SUMMARY

The present invention provides a display device having a decreased number of elements used in a module so as to reduce the volume and weight of the module.

Also, the present invention provides an information processing device having the display device.

According to one aspect of the present invention, a display device includes a display module, a supporting frame, and a fixing frame. The display module includes a backlight unit emitting light and a display panel unit disposed on the backlight unit to display an image based on the emitted light. The supporting frame supports a side face of the display module, and includes a coupling portion used in connecting to an information input device spaced apart from the display module. The fixing frame faces the rear face of the display module and the fixing frame is connected to the supporting frame, so that the fixing frame fixes the display module to the supporting frame.

The supporting frame includes a first side bracket and a second side bracket. The first side bracket includes a first side plate supporting a first side face of the backlight unit. The first side bracket may further include a first bottom plate extending from the first side plate to face the rear face. The second side bracket includes a second side plate supporting a second side face of the backlight unit opposite to the first side face. The second side bracket may further include a second bottom plate extending from the second side plate to face the rear face.

The supporting frame may further include a third side bracket. The third side bracket includes a third side plate supporting a third side face of the backlight unit connecting the first side face to the second side face and a third bottom plate extending from the third side plate to face the rear face.

The fixing frame extends to a fourth side face of the backlight unit. The fourth side face connects the first side face to the second side face.

The coupling portion may extend from an end portion of the first side bracket along a longitudinal direction of the first side bracket. The end portion of the first side bracket is connected to the fixing frame. The display device may further include a combination member. The combination member connects the coupling portion to an information input device spaced apart from the display module, so that the display device is rotatable around the information input device. The display device may further include a first connection member. The first connection member connects the coupling portion to the combination member through a first coupling hole formed on the coupling portion and a second coupling hole formed on the combination member corresponding to the first coupling hole.

The backlight unit includes a receiving frame, a light-guide plate, and a light source. The receiving frame is supported by the first side bracket, the second side bracket, and the fixing frame. The light-guide plate is received by the receiving frame. The light source is disposed between a first side wall of the receiving frame and a side face of the light-guide plate. The first side wall is disposed between the first and the second side plates.

The fixing frame supports the first side wall and the bottom portion adjacent to the first side wall, so that the fixing frame protects the light source. The fixing frame is connected to the first and the second bottom plates. The display device may further include a second connection member connected to a rear face of the receiving frame through the first bottom plate or the second bottom plate.

Alternatively, a first link portion which may include a first protrusion portion is formed on upper faces of the first and the second bottom plates facing the bottom portion of the receiving frame. A second link portion which may include a first recess portion is formed on the bottom portion. The first protrusion portion may be inserted into the first recess portion. A third link portion which may include a third protrusion portion is further formed on lower faces of the first and the second bottom plates. A fourth link portion which may include a fourth recess portion is formed on the fixing frame. The third protrusion portion may be inserted into the fourth recess portion.

The display panel unit includes a display panel and a driving board. The display panel is disposed on the light-guide plate. First and second side faces of the display panel are supported by the first and the second side plates respectively. A driving board is electrically connected to a connection pad formed on an edge of the display panel corresponding to a second wall of the receiving frame facing the first wall. The driving board is disposed on the bottom portion adjacent to the second wall.

The display device may further include protection members. The protection members are disposed on inside faces of the first and the second side plates. The protection members guide the first and the second side faces of the display panel respectively. The protection members are disposed between the first side plate and a third side wall facing the first side plate, and disposed between the second side plate and a fourth side wall facing the second side plate. The protection members support the first and the second side faces of the display panel. The protection member may include a cushion for shock absorption.

The display device may further include a fixing member fixing the display panel to the first and the second side brackets. The fixing member may include an adhesive tape. The adhesive tape is adhered to peripheral areas of the display panel and is bent along each of the first side plate, the second side plate, the first side wall and a second side wall of the receiving frame opposite to the first side wall. The display panel unit may comprise a driving board connected to an edge of the display panel corresponding to the second side wall of the receiving frame. The driving board may be disposed on the bottom portion adjacent to the second side wall and the adhesive tape may cover the driving board to protect the driving board.

According to another aspect of the present invention, an information processing device includes a backlight unit, a display panel unit, a first side bracket, a second side bracket, a fixing frame, a rear housing, a front housing, an information input device and a hinge-joint member.

The backlight unit includes a receiving frame, a light-guide plate and a light source. The receiving frame may include a plurality of side walls and a bottom portion. The light-guide plate is received in the receiving frame. The light source may be disposed to face a side face of the light-guide plate. The display panel unit is disposed on the backlight unit. The first and the second side brackets support the side walls, side faces of the display panel unit and the bottom portion. Wherein the first and the second side brackets include a first and a second coupling portion extending from end portions of the first and the second side brackets. The fixing frame is connected to the first and the second side brackets including a portion facing the bottom portion. The rear housing receives the backlight unit. Wherein the rear housing includes a third coupling portion connected to the first coupling portion and a fourth coupling portion connected to the second coupling portion. The front housing is coupled to the rear housing and has an opening to expose a display area of the display panel unit. The information input device receives information and transmits the information to the display panel unit. The hinge-joint member connects the first and the second coupling portions to the information input device.

The display panel unit includes a lower substrate, an upper substrate, a liquid crystal layer, and a driving board. The lower substrate includes a transparent substrate, data signal lines, a first gate driving part, and a second gate driving part. A display area, a first peripheral area, a second peripheral area, a third peripheral area, and a fourth peripheral area are defined. The first gate driving part is formed on the third peripheral area and drives a first group of the gate lines. The second gate driving part is formed on the fourth peripheral area and drives a second group of the gate lines. The upper substrate faces the lower substrate. The liquid crystal layer is disposed between the lower and upper substrates. The driving board is electrically connected to the data signal lines, and the first and the second gate driving parts through the second peripheral area.

The first distance from the center of the display area to edge of the third peripheral area may be substantially the same as a second distance from the center of the display area to the edge of the fourth peripheral area.

The information processing device may further include adhesive members. The adhesive members are adhered to peripheral areas of the upper substrate corresponding to the first, second, third, and fourth peripheral areas. The adhesive members are bent along the first and the second side brackets, the first side wall, and the second side wall. The information processing device may further include a wire. The wire may be disposed between the rear housing and the first side bracket. The wire transmits signals received from the exterior to the display panel unit. Guide recesses may be formed on the rear housing to guide the signal transmittance wires.

According to the display device and the information processing device having the display device, the number of elements used in the display device, and the volume and weight of the display device may be decreased by using a frame having multiple functions such as a frame forming outlines of the display device and a mechanical connection to an external device.

BRIEF DESCRIPTION OF THE DRAWINGS

The above and other features and advantages of the present invention will become more apparent view of the following detailed example embodiments with reference to the accompanying drawings, in which.

DETAILED DESCRIPTION

Figure 1:
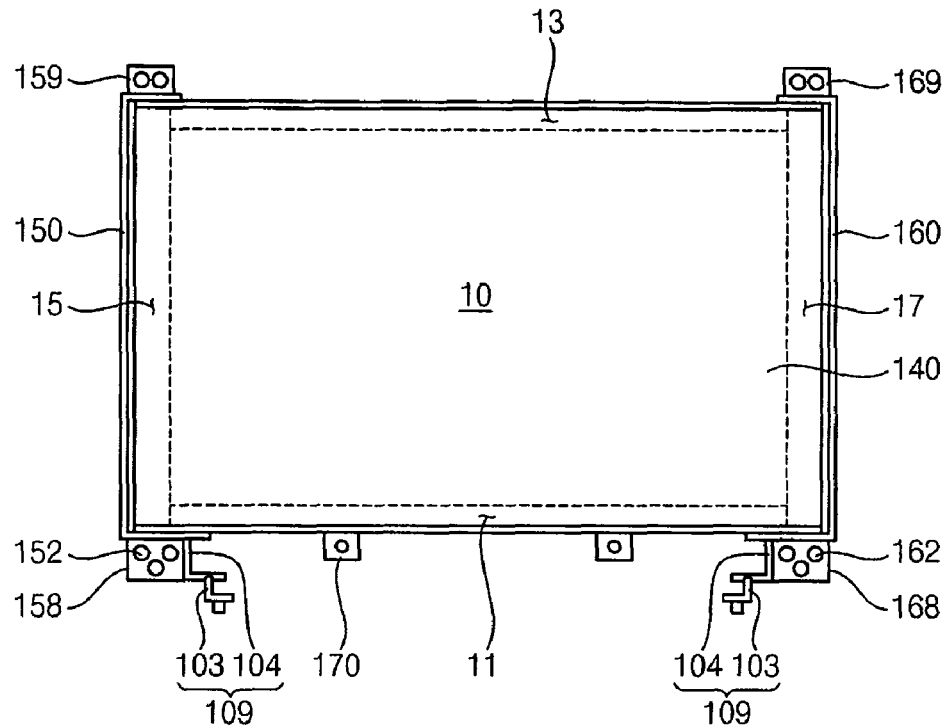
FIG. 1 is a plan view illustrating a front face of a display device in accordance with an embodiment of the present invention.

The present invention is described more fully hereinafter with reference to the accompanying drawings, in which embodiments of the invention are shown. This invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be on, connected to or coupled to the other element or layer, with intervening elements or layers present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

The terminology used herein is for the purpose of describing particular embodiments only and is not intended to limit of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
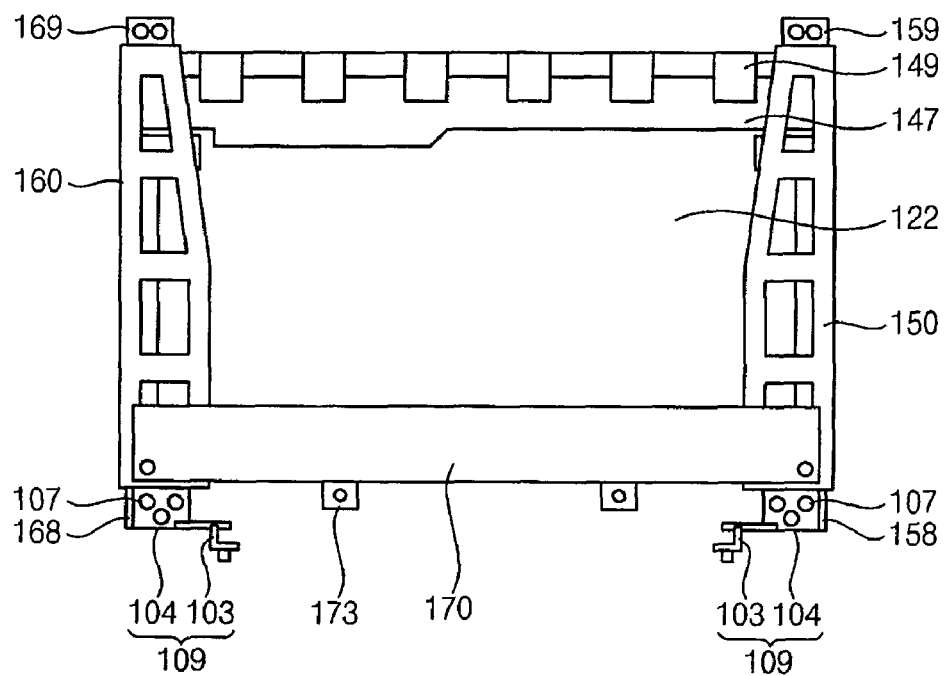
FIG. 2 is a plan view illustrating a rear face of the display device in FIG. 1.
Figure 3:
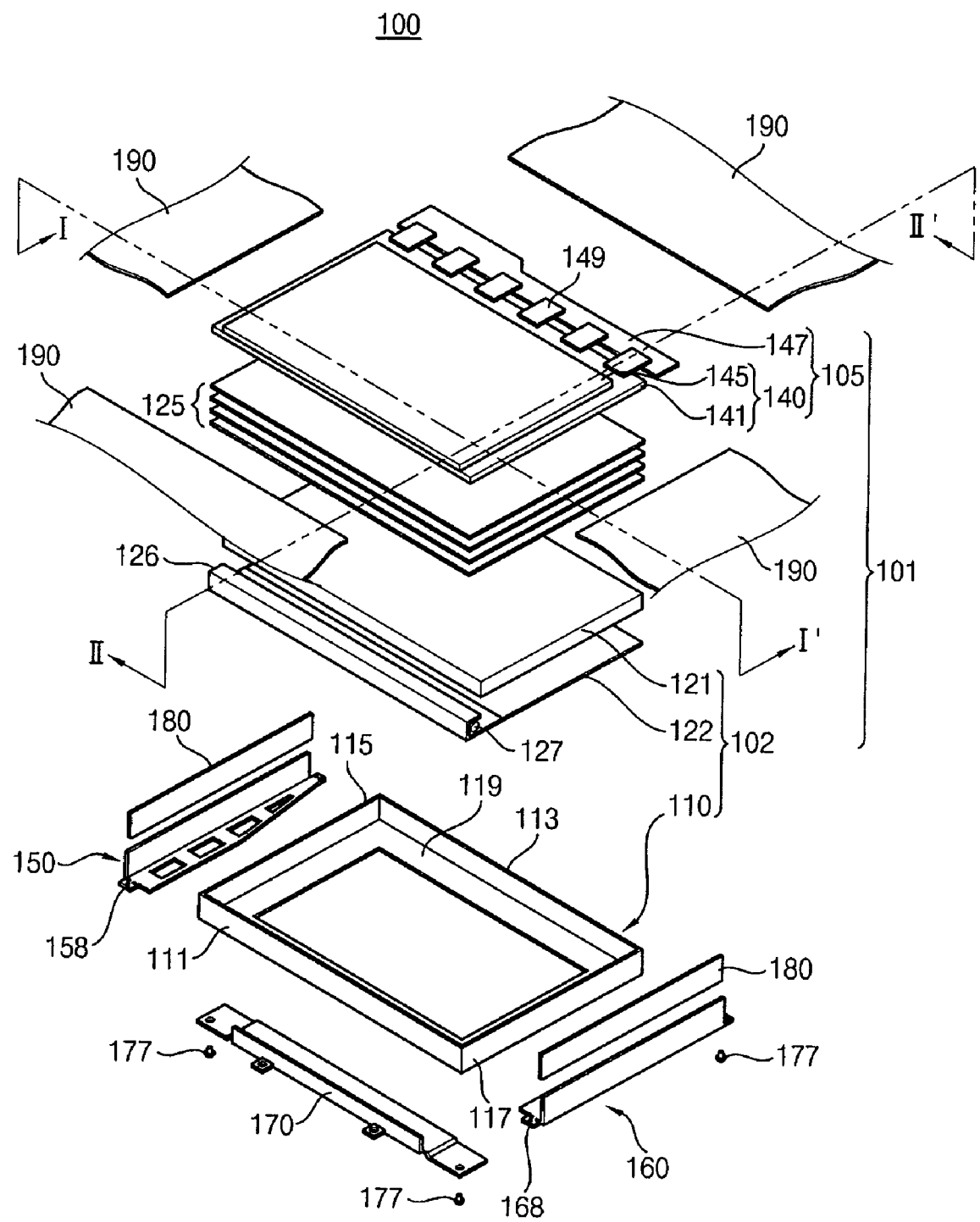
FIG. 3 is an exploded perspective view illustrating the display device in FIG. 1.

FIG. 1 is a plan view illustrating a front face of a display device in accordance with an embodiment of the present invention. FIG. 2 is a plan view illustrating a rear face of the display device in FIG. 1. FIG. 3 is an exploded perspective view illustrating the display device in FIG. 1.

Referring to FIGS. 1 to 3, a display device 100 includes a display module 101, a supporting frame and a fixing frame 170.

The display module 101 may include a backlight unit 102 and a display panel unit 105. The backlight unit 102 emits light. The display panel unit 105 displays an image using the emitted light. A front face of the display panel unit 105 is illustrated in FIG. 1. A rear face of the backlight unit 102 is illustrated in FIG. 2. The backlight unit 102 and the display panel unit 105 are described below.

The supporting frame supports a plurality of side faces of the display module 101. The supporting frame may include a first side bracket 150 and a second side bracket 160.

The first side bracket 150 may face the second side bracket 160. The first and the second side brackets 150 and 160 may support side faces opposite to each other of the backlight unit 102 and side faces opposite to each other of the display panel unit 105, respectively. Each of the first and the second side brackets 150 and 160 respectively may be a chassis formed using metal. Alternatively, the first and the second side brackets 150 and 160 may be mold frames formed by the injection molding method using plastic.

A coupling portion is formed at the supporting frame. The coupling portion may be used for mechanically connecting the display module 101 to an information input device which is separate from the display module 101. For example, the coupling portion may be used for hingedly joining the display module 101 with a body including a keyboard of a notebook computer.

The coupling portion may be formed on end portions of the first and the second side brackets 150 and 160 along a longitudinal direction. A first coupling hole may be formed on the coupling portion.

The fixing frame 170 may be a chassis including metal. Alternatively, the fixing frame 170 may be a mold frame formed by injection molding method using plastic.

The fixing frame 170 may be fixed to the rear face of the backlight unit 102 and the supporting frame. In the present embodiment, the fixing frame 170 is fixed to the first and the second side brackets 150 and 160, respectively. Thus, the uniformity of the distance between the first side bracket 150 and the second side bracket 160 is increased by the fixing frame 170.

The fixing frame 170, the first side bracket 150, and the second side bracket 160 together receive the display module 101. The display module 101 is supported by the fixing frame 170, the first side bracket 150, and the second side bracket 160 and fixed to the fixing frame 170, the first side bracket 150, and the second side bracket 160.

The first side bracket 150, the second side bracket 160, and the fixing frame 170 are described in detail below.

Figure 4:
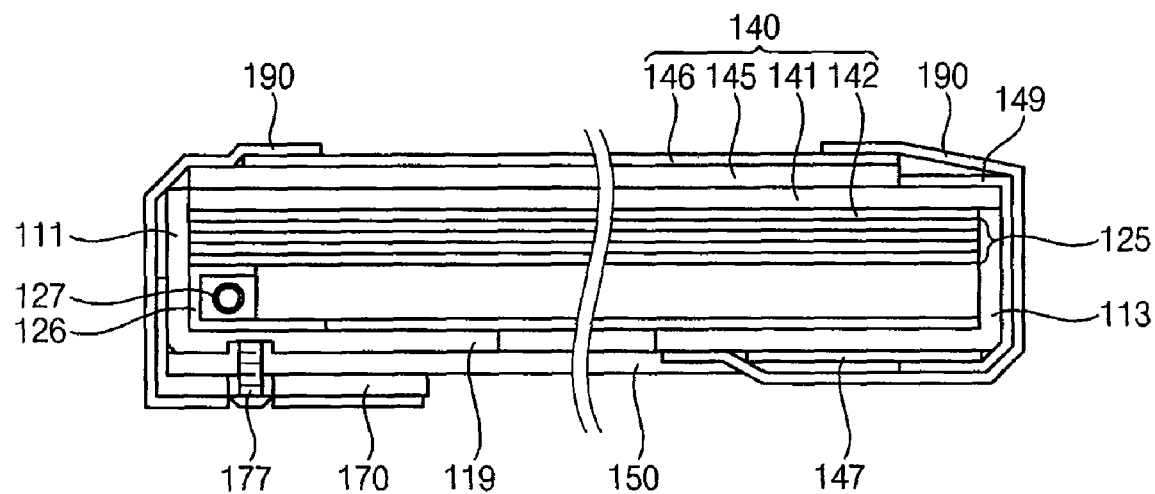
FIG. 4 is a cross-sectional view illustrating the display device taken along II-II' line in FIG. 3.

FIG. 4 is a cross-sectional view illustrating the display device taken along II-II' line in FIG. 3.

Referring to FIGS. 3 and 4, the backlight unit 102 may include a receiving frame 110, a light-guide plate 121, and a light source 127.

The receiving frame 110 may be formed using a plastic material. The receiving frame 110 may have a square shape. For example, the receiving frame 110 may include a first side wall 111, a second side wall 113, a third side wall 115, a fourth side wall 117, and a bottom portion 119.

The first side wall 111 faces the second side wall 113. The third side wall 115 faces the fourth side wall 117. The third and fourth side walls 115 and 117 are disposed along a direction substantially perpendicular to a longitudinal direction of the first side wall 111 or the second side wall 113. The bottom portion 119 extends from the first, second, third, and fourth side walls 111, 113, 115 and 117. An opening is formed in the middle of the bottom portion 119. Alternatively, at least one of the first, second, third and fourth side walls 111, 113, 115 and 117 may be omitted.

The light-guide plate 121 is received in the receiving frame 110. The light-guide plate 121 includes a plurality of side faces, a light-emitting face and a light-reflecting face. The side faces face the first, second, third, and fourth side walls 111, 113, 115 and 117 respectively. The light-emitting face is opposite to the light-reflecting face. The light-reflecting face faces the bottom portion 119. The light-emitting face and the light-reflecting face are connected to each other by the side faces.

The light-guide plate 121 may be formed using a light-diffusing material which has various characteristics such as light transparence, thermal resistance, chemical resistance, mechanical strength, etc. Examples of light-diffusing material that may be used for the light-diffusing material include polyethylene, polymethylmethacrylate, polyamide, polyimide, polypropylene, polyurethane, etc.

The backlight unit 102 may further include a reflecting sheet 122 and an optical sheet 125.

The reflecting sheet 122 is disposed between the bottom portion 119 of the receiving frame 110 and the light-reflecting face of the light-guide plate 121 to cover the opening of the bottom portion 119. The reflecting sheet 122 reflects light leaking from the light-reflecting face toward the light-guide plate 121.

The optical sheet 125 is disposed on the light-emitting face of the light-guide plate 121. The optical sheet 125 improves optical characteristics of the light emitted from the light-emitting face. For example, the optical sheet 125 may include a diffusing sheet disposed on the light-emitting face and a plurality of condensing sheets disposed on the diffusing sheet. The diffusing sheet diffuses the light emitted from the light-emitting face to improve luminance uniformity of the light. The condensing sheet may be a prism sheet. The condensing sheets may be disposed on the diffusing sheet. For example, condensing directions of the condensing sheets may be substantially perpendicular to each other.

The light source 127 is disposed between the first side wall 111 and the side face of the light-guide plate 121 facing the first side wall 111. Alternatively, the light source 127 may face other side faces of the light-guide plate 121. The light source 127 may be a cold cathode fluorescent lamp (CCFL). Alternatively, the light source 127 may be a light-emitting diode (LED).

The backlight unit 102 may further include a lamp reflector 126. The lamp reflector 126 surrounds the light source 127, and reflects light emitted from the light source 127 toward the side face of the light-guide plate 121.

The light which is incident into the light-guide plate 121 may be repeatedly reflected from the side faces, the light-emitting face and the light-reflecting face, so that the light is emitted from the light-emitting face. An optical pattern such as a dot pattern may be formed on the light-reflecting face, so that the optical pattern may reflect and diffuse the light. Thus, the light emitted from the light source 127 is converted into surface light, and the surface light is emitted from the light-emitting face.

The display panel unit 105 is disposed on the optical sheet 125. The display panel unit 105 displays the image on the basis of the light of which the optical characteristics are controlled by the optical sheet 125. The display panel unit 105 may include a display panel 140, a driving board 147, and a flexible connecting film 149.

The display panel 140 may include a lower substrate 141, an upper substrate 145 and a liquid crystal layer (not shown).

The lower substrate 141, for example, may include a lower transparent substrate, data signal lines (not shown), a first gate driving part and a second gate driving part.

As shown in FIG. 1, a display area 10 on the lower transparent substrate corresponds to a display screen. A first peripheral area 11 on the lower transparent substrate corresponds to the first side wall 111. A second peripheral area 13 on the lower transparent substrate corresponds to the second side wall 113. A third peripheral area 15 on the lower transparent substrate corresponds to the third side wall 115. A fourth peripheral area 17 on the lower transparent substrate corresponds to the fourth side wall 117. The first, second, third, and fourth peripheral areas 11, 13, 15 and 17 surround the display area.

A plurality of pixels, data lines and gate lines are formed in the display area. The pixel includes a switching device and a pixel electrode electrically connected to a drain electrode of the switching device.

The gate line is electrically connected to a gate electrode of the switching device. The data line crosses the gate line, and is electrically connected to a source electrode of the switching device.

A data signal applied to the data line is applied to the pixel electrode through the source electrode. A control signal is applied to the gate electrode through the gate line, so that the control signal may control the application of the data signal to the pixel electrode.

The data signal lines are formed on the second peripheral area to be electrically connected to the data lines.

The first gate driving part is formed on the third peripheral area. The first gate driving part drives a first group of the gate lines, for example, odd numbered gate lines. The second gate driving part is formed on the fourth peripheral area. The second gate driving part drives a second group of the gate lines; for example, even numbered gate lines.

The upper substrate 145 faces the lower substrate 141. The upper substrate 145 may include an upper transparent substrate, color filters and common electrode. The color filters are disposed on the upper transparent substrate, so that the color filters correspond to the pixels, respectively. The color filters may include a red color filter, a green color filter, and a blue color filter. The common electrode may be formed over the entirety of the planarization layer which covers the color filters.

The liquid crystal layer is disposed between the lower and upper substrates 141 and 145.

The display panel 140 may further include a lower polarizing plate and an upper polarizing plate. The lower polarizing plate is disposed on a lower face of the lower substrate 141. The upper polarizing plate is disposed on an upper face of the upper substrate 145.

The driving board 147 may be electrically connected to the data signal lines, the first and the second gate driving parts through the second peripheral area.

A first distance from the center of the display area 10 to the end portion of the third peripheral 15 may be substantially the same as a second distance from the center of the display area 10 to the end portion of the fourth peripheral 17.

The flexible connecting film 149 electrically connects the driving board 147 with the data signal lines, the first and the second gate driving parts.

The driving board 147 may output panel driving signals such as data signals to the data signals, and also output gate signals to the first and the second gate driving parts through the flexible connecting film 149. The driving board 147 may control the intensity of the electrical field between the pixel electrode and common electrode, so that the arrangement of liquid crystals between the pixel electrode and common electrode may vary to alter the light transmittance of the liquid crystal layer.

Light emitted from the optical sheet 125 is polarized through the lower polarizer. The polarized light is incident into the liquid crystal layer. The amount of light transmitting the liquid crystal layer is determined by the light transmittance of the liquid crystal layer. The light having passed through the liquid crystal layer is polarized by the upper polarizing plate, so that an image is displayed by the light having passed through the upper polarizing plate.

A first side face of the display panel 140, for example, a first side face of the lower substrate 141 may be supported by the first side wall 111 of the receiving frame 110, and the display panel 140 may be supported by an upper end portion of the second side wall 113 as illustrated in FIG. 4. Alternatively, the display panel 140 may be supported by an upper end portion of the first side wall 111, and a second side face of the lower substrate 141 may be supported by the second side wall 113 of the receiving frame 110.

Figure 5:
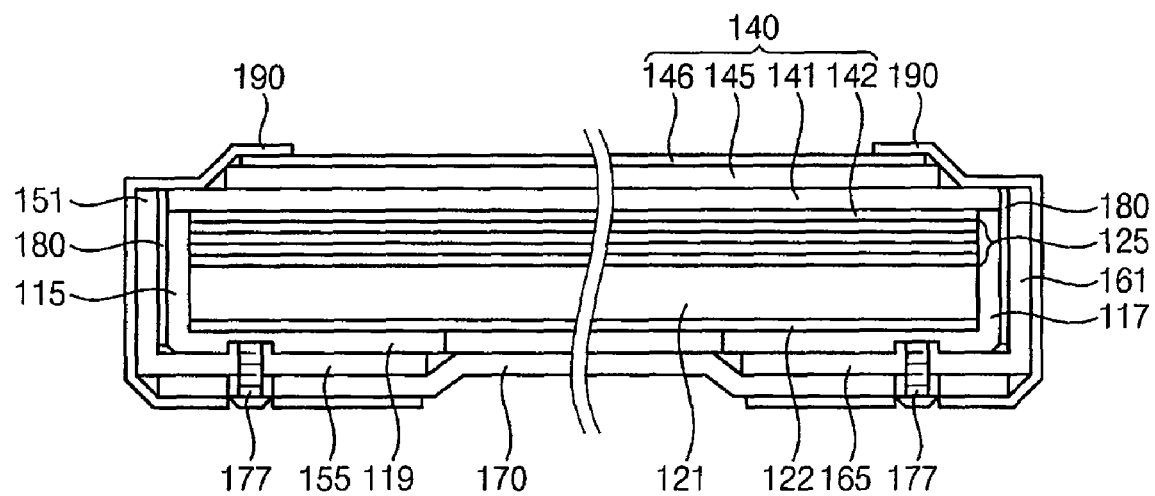
FIG. 5 is a cross-sectional view illustrating the display device taken along a line I-I' in FIG. 3.
Figure 6:
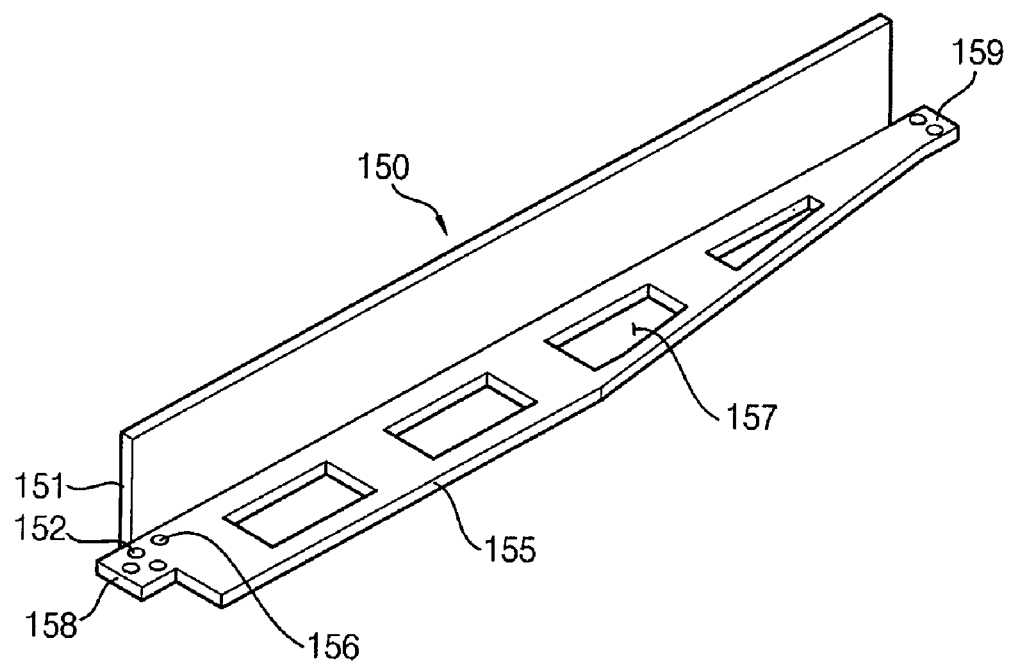
FIG. 6 is a perspective view illustrating a first side bracket in FIG. 3.

FIG. 5 is a cross-sectional view illustrating the display device taken along a line I-I' in FIG. 3. FIG. 6 is a perspective view illustrating a first side bracket 150 in FIG. 3.

Referring to FIGS. 3, 5, and 6, the display panel 140 may be supported by upper portions of the third and fourth side walls 115 and 117.

The first side bracket 150 may support the third side wall 115, the first side face of the display panel 140 and the bottom portion 119 connected to the third side wall 115. The first side bracket 150 may include a first side plate 151 and a first bottom plate 155.

The first side plate 151 faces the third side wall 115, and has a height greater than that of the third side wall 115. Thus, the first side plate 151 may support the third side wall 115 and the first side face of the display panel 140. The first bottom plate 155 extends from the first side plate 151 to face the bottom portion 119. A cross-sectional view of the first side bracket 150 taken along a plane perpendicular to a longitudinal direction of the first side bracket 150 may have an L-shape.

Openings 157 are formed through the first bottom plate 155 to decrease the weight of the first side bracket 150. A first connection hole 156 is formed on an end portion of the first bottom plate 155 along the longitudinal direction, so that the first connection hole 156 is used for connecting the first side bracket 150 to the fixing frame 170.

A first coupling portion may be referred to as the coupling portion formed on the first bottom plate 155. The first coupling portions 158 and 159, for example, may extend from the end portions of the first bottom plate 155 along the longitudinal direction, respectively, as illustrated in FIGS. 1 and 6. The first coupling hole 152 is formed on the first coupling portions 158 and 159, respectively.

The second side bracket 160 may have a substantially symmetrical shape with respect to the first side bracket 150. The second side bracket 160 may support the fourth side wall 117, a second side face of the display panel 140 and the bottom portion 119 connected to the fourth side wall 117. The second side bracket 160 may include a second side plate 161 and a second bottom plate 165.

The second side plate 161 faces the fourth side wall 117, and may support the fourth side wall 117 and the second side face of the display panel 140. The second bottom plate 165 extends from the second side plate 161 to face the bottom portion 119.

A second coupling portion may be referred to as the coupling portion formed on the second bottom plate 165. The second coupling portions 168 and 169, for example, may extend from the end portions of the second bottom plate 165 along the longitudinal direction, respectively, as illustrated in FIG. 1. A first coupling hole 162 is formed on the second coupling portions 168 and 169, respectively.

Alternatively, the supporting frame may further include a third side bracket. The third side bracket may be disposed on the second side wall 113. The third side bracket may include a third side plate and a third bottom plate. The third side plate may support the second side wall 113 and a third side face of the display panel 140. The third bottom plate may support the bottom portion 119 connected to the second side wall 113.

The display device 100 may further include protection members 180.

A first protection member 180 is disposed between the first side plate 151 and the third side wall 115, and a second protection member 180 is disposed between the second side plate 161 and the fourth side wall 117. The protection members 180 extend upward to the upper ends of the first and the second side plates 151 and 161, respectively, so that the protection members 180 may guide the first and the second side faces of the display panel 140. The protection member 180 may include a cushion which may be formed using rubber for shock absorption.

The first and the second side faces of the display panel 140 which is formed using glass may be spaced apart from the first and the second side plates 151 and 161 which are formed using metal, so that the first and the second side faces of the display panel 140 contact the protection members 180 that have good contact characteristics for glass. Thus, the display panel 140 is protected from damage due to an external impact, and a separation between the display panel 140 and the protection members 180 may be prevented.

Figure 7:
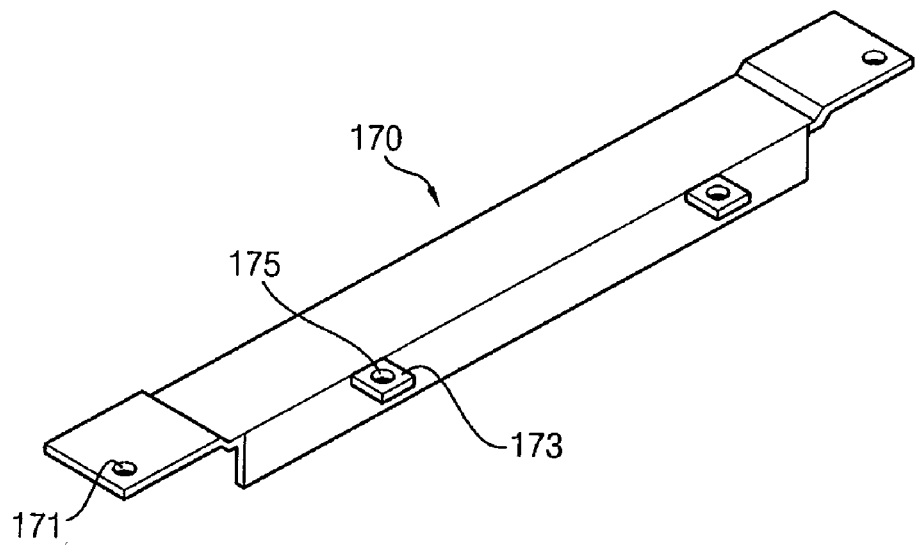
FIG. 7 is a perspective view illustrating a fixing frame in FIG. 3.
Figure 8:
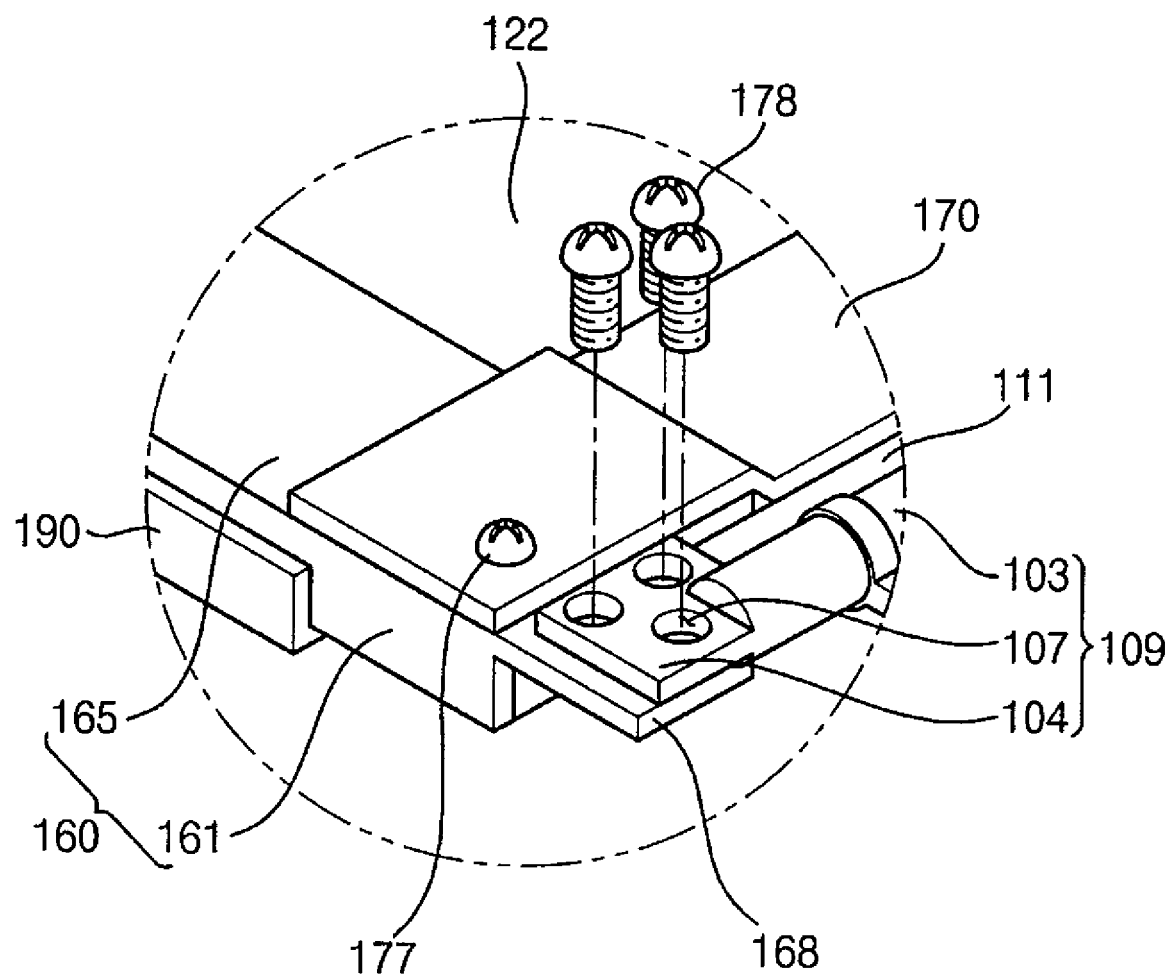
FIG. 8 is a perspective view illustrating a fixing frame connected to a second side bracket in FIG. 1.

FIG. 7 is a perspective view illustrating a fixing frame in FIG. 3. FIG. 8 is a perspective view illustrating a fixing frame connected to a second side bracket 160.

Referring to FIGS. 3, 4, 5 and 7, the fixing frame 170 is connected to the first and the second side brackets 150 and 160 to face the bottom portion 119 adjacent to the first side wall 111. The fixing frame 170 protects the light source 127 from an external impact. The fixing frame 170 may extend to face the first side wall 111. Alternatively, the fixing frame 170 may be only disposed on the bottom portion 119.

Referring to FIGS. 2 and 8, end portions of the fixing frame 170 along a longitudinal direction are disposed on the first bottom plate 155 of the first side bracket 150 and the second bottom plate 165 of the second bracket 160. A second connection hole 171 is formed on the end portions of the fixing frame 170, so that the first connection holes 156 of the first and the second bottom plates 155 and 165 and the second connection hole 171 are assembled using a screw. A connection portion 173 protrudes from an edge of the fixing frame 170 along a width direction, and a screw-connection hole 175 is formed on the connection portion 173. The connection portion 173 is used in connecting the display device 100 with a housing which receives the display device 100.

As illustrated in FIGS. 5 and 8, a first connection member 177 that may be a connection screw is inserted into the bottom portion 119 of the receiving frame 110 through the second connection hole 171 of the fixing frame 170 and the first connection hole 156 of the first bottom plate 155. Another connection screw is inserted into the bottom portion 119 of the receiving frame 110 through the second connection hole 171 of the fixing frame 170 and the first connection hole 156 of the second bottom plate 165. Thus, a hole or a recess may be formed on the bottom portion 119 for a screw-connection.

Uniformity of the distance between the first and the second side brackets 150 and 160 is increased by the connection of the fixing frame 170, the first and the second bottom plates 155 and 165, so that the fixing frame 170, the first and the second side brackets 150 and 160 may together form a container.

Referring to FIG. 8, the display device 100 may further include a combination member 109. Each of the combination members 109 are connected to each of the first and the second coupling portions 158 and 168.

The combination member 109 may be a hinge-joint member. The combination member 109 may include a combination portion 104 and a hinge portion 103. A second coupling hole 107 is formed on the combination portion 104 corresponding to the first coupling hole 162 of the second coupling portion 168. The combination portion 104 is disposed on the second coupling portion 168, so that the second coupling hole 107 is arranged on the first coupling hole 162. The hinge portion 103 is connected to the combination portion 104, so that the hinge portion 103 could revolve around the combination portion 104.

The display device 100 may include a second connection member 178. The second connection member 178, for example a screw, connects the first coupling portion 158 with the first of the combination members 109, and connects the second coupling portion 168 with a second one of the combination members 109 through the first coupling holes 152 and 162 and second coupling holes 107. When the housing receives the display device 100, the screw may be inserted into a rear face of the housing.

The hinge portion 103 of the combination member 109 may be connected to the information input device. Thus, the display device 100 may be rotatable around the information input device. For example, the display device 100 may be a monitor of a notebook computer, and the information input device may be a body including a keyboard of the notebook computer.

Referring again to FIGS. 3, 4 and 5, the display device 100 may further include a fixing member. The fixing member 190 fixes the display panel 140 to the first and the second side brackets 150 and 160. The fixing member may include adhesive tapes 190.

The adhesive tapes 190 may be disposed on four edges of the display panel 140, respectively, as illustrated in FIG. 3. Each of the adhesive tapes 190 may be adhered to edges of the upper substrate 145, for example, areas corresponding to the first, second, third and fourth peripheral areas 11, 13, 15 and 17.

Each of the adhesive tapes 190 are bent along the first side plate 151 of the first side bracket 150, the second side plate 161 of the second side bracket 160, and the first and the second side walls 111 and 113 of the receiving frame 110, so that the adhesive tapes 190 are adhered to the first bottom plate 155 of the first side bracket 150, the second bottom plate 165 of the second side bracket 160 and the bottom portion 119 of the receiving frame 110, respectively. Thus, the display panel unit 105 is securely fixed to the receiving frame 110, and the first and the second side brackets 150 and 160 by the adhesive tapes 190.

The adhesive tape 190 disposed on the second side wall 113 may cover the driving board 147 to protect the driving board 147. For example, only a portion of the adhesive tape 190 corresponding to the first, second, third, and fourth peripheral areas 11, 13, 15 and 17, the first bottom plate 155, the second bottom plate 165, and the bottom portion 119 may be adhesive and a remainder of the adhesive tape 190 may be non-adhesive.

In another embodiment, a bottom chassis and a back cover in a conventional display device may form a container that substantially receives and protects a display panel unit and a backlight unit. According to the display device 100 in accordance with the present embodiment, the fixing frame 170 and the supporting frame including the first and the second side brackets 150 and 160 are assembled into the container that substantially receives and protects the display panel unit 105 and the backlight unit 102.

In another embodiment, a top chassis fixes a display panel to the bottom chassis. According to the display device 100 in accordance with the present embodiment, the fixing member 190 such as the adhesive tape 190 fixes the display panel 140 to the supporting frame and the fixing frame 170.

Thus, according to the display device 100 in accordance with the present embodiment, the bottom chassis, the back cover and the top chassis may be omitted, so that the thickness and the weight of the display device 100 may be decreased.

In another embodiment, the display device may be connected and fixed to a housing member by a bracket member being separate from the conventional display device. According to the display device 100 in accordance with the present embodiment, the display device 100 is connected and fixed to the housing by the first and the second side brackets 150 and 160 of the display device 100.

The first and the second side brackets 150 and 160 include the first and the second coupling portions 158 and 168, respectively, which are mechanically connected to the information input device. The combination members 109 connect the first and the second coupling portions 158 and 168 of the display device 100 to the information input device. Thus, the display device 100 may be rotatable around the information input device while the display device 100 is connected to the information input device.

Figure 9:
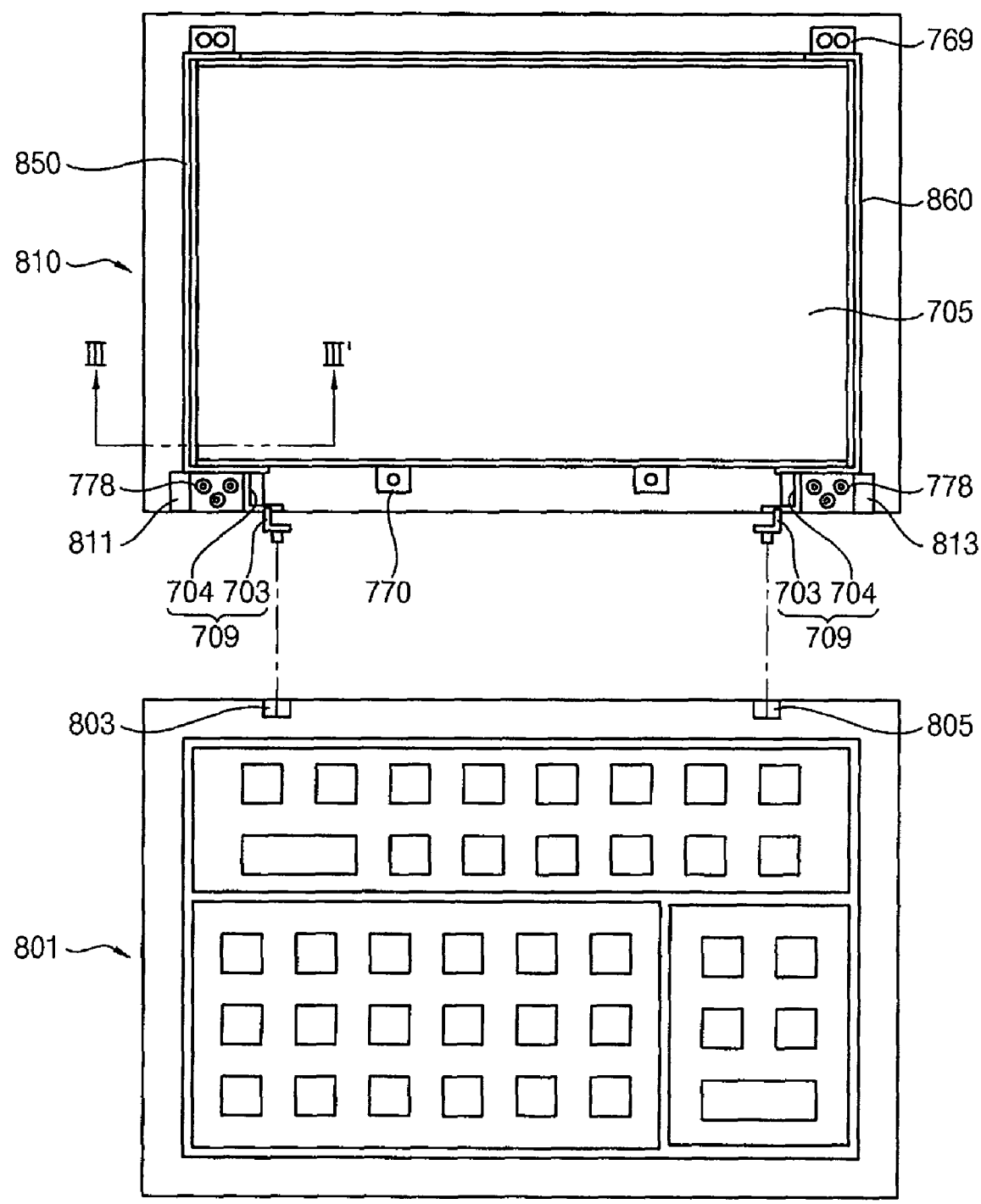
FIG. 9 is a plan view illustrating an information processing device having the display device in FIG. 1.
Figure 10:
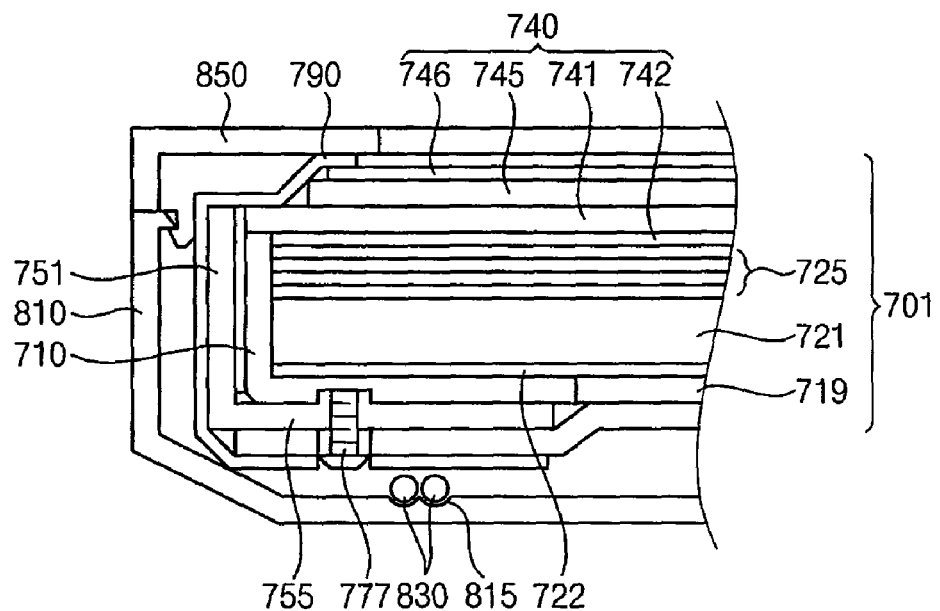
FIG. 10 is a cross-sectional view illustrating the information processing device taken along a line III-III' in FIG. 9.

FIG. 9 is a plan view illustrating an information processing device having the display device in FIG. 1. FIG. 10 is a cross-sectional view illustrating the information processing device taken along a line III-III' in FIG. 9.

Referring to FIGS. 9 and 10, the information processing device 700 includes a display device 701, a rear housing 810 and a front housing 850.

The display device 701 may be substantially the same as the display device 100 illustrated in FIGS. 1 to 8. Thus, the display device 701 may include a backlight unit, a display panel unit 705, a first side bracket 750, a second side bracket 760 and a fixing frame 770.

The backlight unit may include a receiving frame 710, a light-guide plate 721 and a light source.

The receiving frame 710 may include first and second side walls facing each other, third and fourth side walls which connect the first side wall to the second side wall and also facing each other, and a bottom portion 719 extending from the first, second, third and fourth side walls.

The light-guide plate 721 is received in the receiving frame 710.

The light source is disposed between the first side wall and a side face of the light-guide plate 721.

The display panel unit 705 is disposed on the backlight unit, and displays an image based on light emitting from the backlight unit. The display panel unit 705 may include a lower substrate 741, an upper substrate 745 and a liquid crystal layer.

A display area on the lower substrate 741 corresponds to a display screen. A first peripheral area on the lower substrate 741 corresponds to the first side wall. A second peripheral area on the lower substrate 741 corresponds to the second side wall. A third peripheral area on the lower substrate 741 corresponds to the third side wall. A fourth peripheral area on the lower substrate 741 corresponds to the fourth side wall. The first, second, third and fourth peripheral areas surround the display area.

The front housing 850 receives the display device 701 to expose the display screen. The front housing 850 includes upper, lower, left, and right bazel portions corresponding to the first, second, third, and fourth peripheral areas, respectively.

In the information processing device 700 in accordance with the present embodiment, a first distance between a center of the display area and an edge of the third peripheral area is substantially the same as a second distance between the center of the display area and an edge of the fourth peripheral area. Thus, a center of the display panel 740 may be substantially the same as the center of the display area. When a width of the left bazel is substantially the same as that of the right bazel, gaps may not be formed between side faces of the display panel 740 and side faces extending from the left and right bezels of the front housing 850.

The first side bracket 750 supports the third side wall, the bottom portion 719 adjacent to the third side wall, and the first side face of the display panel 740. The first coupling portions may extend from the end portions of the first side bracket 750 along the longitudinal direction.

The second side bracket 760 supports the fourth side wall, the bottom portion 719 adjacent to the fourth side wall, and the second side face of the display panel 740. The second coupling portions may extend from the end portions of the second side bracket 760 along the longitudinal direction.

The fixing frame 770 is disposed on the bottom portion 719 adjacent to the first side wall. The fixing frame 770 is connected to the first side bracket 750, the second side bracket 760, and the bottom portion 719 so that the fixing frame 770 fixes the receiving frame 710 to the first and the second side brackets 750 and 760.

The rear housing 810 faces the front housing 850 to receive the backlight unit. The rear housing 810 includes a third coupling portion and a fourth coupling portion. The third coupling portion is connected to the first coupling portion, and the fourth coupling portion is connected to the second coupling portion.

The front housing 850 is connected to the rear housing 810 to expose the display screen.

The information processing device 700 may further include an information input device 801 and a hinge-joint member 709. The information input device 801 and the hinge-joint member 709 may be substantially the same as the information input device and the hinge-joint member 109 illustrated in FIGS. 1 to 8.

The backlight unit and the display panel unit 705, for example, may be assembled into a monitor of a notebook computer, and the information input device 801 may be a body including a keyboard of the notebook computer.

The information input device 801 receives information which may be displayed on the display screen to the display panel unit 705. The information input device 801 may include a fifth coupling portion 803 and a sixth coupling portion 805.

The hinge-joint member 709 connects the first coupling portion to the fifth coupling portion 803, and connects the second coupling portion to the sixth coupling portion 805. Thus, the display device 701 may be rotatable around the information input device 801 while the display device 701 may be connected to the information input device 801.

The information processing device 700 may further include an adhesive member 790. The adhesive member 790 is adhered to areas of the display device 701 corresponding to the first, second, third, and fourth peripheral areas. The adhesive member 790 is bent along the first side bracket 750, the second side bracket 760, and the first and the second side walls of the receiving frame 710 so that the adhesive member 790 is adhered to the bottom portion 719 of the receiving frame 710.

The information processing device 700 may further include signal transmittance wires 830. The signal transmittance wires 830 may be disposed between the rear housing 810 and the first bottom plate 755 of the first side bracket 750. Alternatively, the signal transmittance wires 830 may be disposed between the rear housing 810 and the second bottom plate of the second side bracket 760.

The signal transmittance wires 830 may be signal receiving antennas. The signal transmittance wires 830 may transmit signals received from the exterior to the information input device 801 or the display panel unit 705. Guide recesses 815 which guide the signal transmittance wires 830 may be formed on the rear housing 810.

Figure 11:
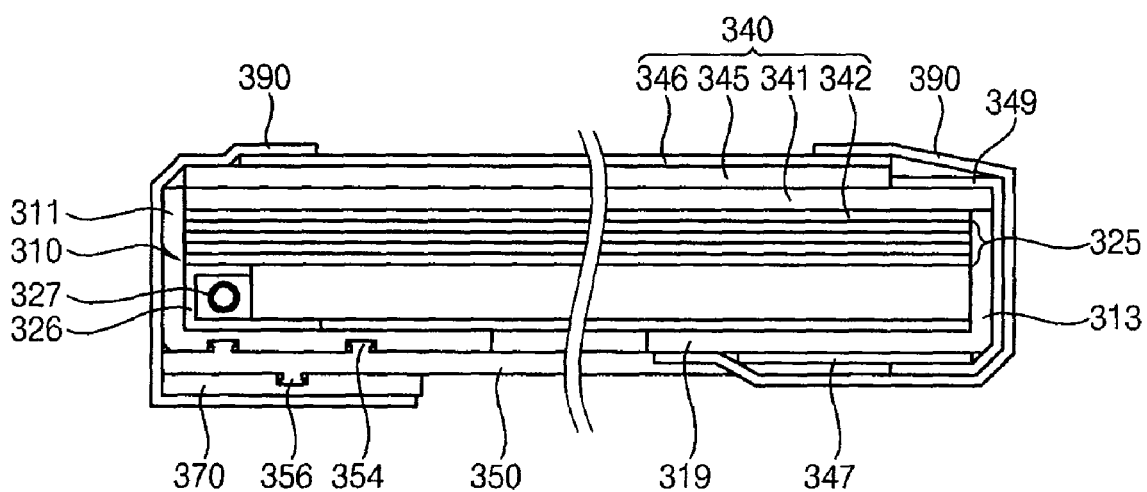
FIG. 11 is a cross-sectional view illustrating a display device in accordance with another embodiment of the present invention.

FIG. 11 is a cross-sectional view illustrating a display device in accordance with another embodiment.

Referring to FIG. 11, the display device 300 is substantially the same as the display device 100 illustrated in FIGS. 1 to 8, except for a connection between a supporting frame and a fixing frame 370.

In the present embodiment, a first link portion 354 that may be a connection protrusion 354 is formed on upper faces of first and second bottom plates facing a bottom portion 319 of a receiving frame 310. A second link portion connected to the first link portion 354 that may be a connection recess is formed on the bottom portion 319.

A third link portion 356 that may be a connection protrusion 356 is further formed on lower faces of the first and the second bottom plates, and a fourth link portion connected to the third link portion 356 that may be a connection recess is formed on the fixing frame 370.

According to the display device 300 in accordance with the present embodiment, the number of screws used in the connection may be decreased so that the number of elements used in the display device 300 may be decreased and the assembling process may be simplified.

An information processing device in accordance with the present embodiment is substantially the same as the information processing device 700 illustrated in FIGS. 9 and 10, except the information processing device includes the display device 300 in accordance with the present embodiment.

A display device of another embodiment is connected and fixed to a housing member by a bracket member separated from the conventional display device. According to the information processing device in FIGS. 1 to 10, the display device is connected and fixed to the front and rear housings by the first and the second side brackets of the display device.

The first and the second side brackets include the first and the second coupling portions, respectively, which are mechanically connected to the information input device. The combination members connect the first and the second coupling portions of the display device to the information input device. Thus, the display device may be rotatable around the information input device with couplings connected to the information input device.

Thus, according to the display device and the information processing device in accordance with the present embodiment, a conventional bottom chassis and a conventional back cover are unnecessary, and an additional side bracket member is not needed. Further, a conventional top chassis may be omitted.

Therefore, the display device and the information processing device in accordance with the present embodiment may be used in simplifying frame structures of a display device such as a notebook computer or a wall-hanging television receiver set, and an information processing device.

The foregoing is illustrative of the present invention and is not to be construed as limiting thereof. Although example embodiments of the present invention have been described, those skilled in the art will readily appreciate that many modifications of the example embodiments are possible without materially departing from the novel teachings and advantages of the present invention. Accordingly, all such modifications are intended to be included within the scope of this invention as defined in the claims. It is to be understood that the foregoing is illustrative of the present invention and is not to be construed as limited to the embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display device, comprising:
    a display module comprising:
        a backlight unit emitting light; and
        a display panel unit disposed on the backlight unit;
    a supporting frame supporting a side face of the display module, the supporting frame including a coupling portion; and
    a fixing frame including a portion facing a rear face of the display module, the fixing frame being connected to the supporting frame, whereby the fixing frame fixes the display module to the supporting frame,
    wherein the supporting frame comprises:
        a first side bracket including a first side plate supporting a first side face of the backlight unit; and
        a second side bracket including a second side plate supporting a second side face of the backlight unit opposite to the first side face, the second side bracket being separated from the first side bracket.

2. The display device of claim 1, wherein the first side bracket further includes a first bottom plate extending from the first side plate to face the rear face, and the second side bracket further includes a second bottom plate extending from the second side plate to face the rear face.

3. The display device of claim 2, wherein the supporting frame further comprises a third side bracket, comprising;
    a third side plate supporting a third side face of the backlight unit connected to the first side face and the second side face; and
    a third bottom plate extending from the third side plate to face the rear face.

4. The display device of claim 2, wherein the fixing frame extends to a fourth side face of the display module, wherein the fourth side face is connected to the first side face and the second side face.

5. The display device of claim 2, wherein the coupling portion extends from an end portion of the first side bracket along a longitudinal direction of the first side bracket, and the end portion of the first side bracket is connected to the fixing frame.

6. The display device of claim 5, further comprising a combination member that connects the coupling portion to an information input device spaced apart from the display module, so that the display device is rotatable around the information input device and is connected to the information input device.

7. The display device of claim 6, further comprising a first connection member that connects the coupling portion to the combination member through a first coupling hole formed on the coupling portion and a second coupling hole formed on the combination member corresponding to the first coupling hole.

8. The display device of claim 2, wherein the backlight unit comprises:
    a receiving frame supported by the first side bracket, the second side bracket, and the fixing frame;
    a light-guide plate received in the receiving frame; and
    a light source disposed between a first side wall of the receiving frame and a side face of the light-guide plate, wherein the first side wall is disposed between the first side plate and second side plates.

9. The display device of claim 8, wherein the fixing frame supports the first side wall and a bottom portion adjacent to the first side wall, so that the fixing frame protects the light source and the fixing frame is connected to the first and the second bottom plates.

10. The display device of claim 9, further comprising a second connection member connected to a rear face of the receiving frame through the first bottom plate or the second bottom plate.

11. The display device of claim 9, wherein a first link portion which includes a first protrusion portion is formed on upper faces of the first and the second bottom plates facing the bottom portion of the receiving frame, and
    a second link portion which includes a first recess portion is formed on the bottom portion, the first protrusion portion being inserted into the first recess portion.

12. The display device of claim 11, wherein a third link portion which includes a third protrusion portion is formed on lower faces of the first and the second bottom plates, and
    a fourth link portion which includes a fourth recess portion is formed on the fixing frame, the third protrusion portion being inserted into the fourth recess portion.

13. The display device of claim 8, wherein the display panel unit comprises a display panel disposed over the light-guide plate, the display panel including a first side face and a second side face.

14. The display device of claim 13, wherein the first side face faces an inside face of the first side plate.

15. The display device of claim 13, further comprising a protection member disposed on an inside face of the first side plate, the protection member including a first portion facing the first side face of the display panel.

16. The display device of claim 15, wherein the protection member further comprises a second portion disposed between the first side plate and a third side wall of the receiving frame facing the first side plate.

17. The display device of claim 15, wherein the protection member comprises a cushion for shock absorption.

18. The display device of claim 13, further comprising a fixing member fixing the display panel to the first and the second side brackets.

19. The display device of claim 18, wherein the fixing member includes an adhesive tape adhered to a peripheral area of the display panel and the adhesive tape is bent along each of the first side plate, the second side plate, the first side wall and a second side wall of the receiving frame opposite to the first side wall.

20. The display device of claim 19, wherein the display panel unit comprises a driving board connected to an edge of the display panel corresponding to the second side wall, the driving board being disposed on the bottom portion adjacent to the second side wall and the adhesive tape covering the driving board to protect the driving board.

21. An information processing device, comprising:
a backlight unit comprising:
a receiving frame including a plurality of side walls and a bottom portion;
a light-guide plate received in the receiving frame; and
a light source facing a side face of the light-guide plate;
a display panel unit disposed on the backlight unit;
first and second side brackets supporting the side walls, side faces of the display panel unit and the bottom portion, the second side brackets being separated from the first side bracket, wherein the first and the second side bracket include a first and a second coupling portion extending from end portions of the first and the second side brackets;
a fixing frame connected to the first and the second side brackets including a portion facing the bottom portion;
a rear housing receiving the backlight unit, wherein the rear housing includes a third coupling portion connected to the first coupling portion and a fourth coupling portion connected to the second coupling portion;
a front housing coupled to the rear housing and having an opening to expose a display area of the display panel unit;
an information input device receiving information and transmitting the information to the display panel unit; and
a hinge-joint member connecting the first and the second coupling portions to the information input device.

22. The information processing device of claim 21, wherein the display panel unit comprises:
a lower substrate including:
a transparent substrate including a display area including gate and data lines, first, second, third, and fourth peripheral areas;
data signal lines formed on the second peripheral area to be electrically connected to the data lines;
a first gate driving part formed on the third peripheral area, and driving a first group of the gate lines; and
a second gate driving part formed on the fourth peripheral area, and driving a second group of the gate lines
an upper substrate facing the lower substrate;
a liquid crystal layer disposed between the lower and upper substrates; and
a driving board electrically connected to the data signal lines, and the first and the second gate driving parts through the second peripheral area.

23. The information processing device of claim 22, wherein a first distance from a center of the display area to an edge of the third peripheral area is substantially the same as a second distance from the center of the display area to an edge of the fourth peripheral area.

24. The information processing device of claim 23, further comprising adhesive members, wherein the adhesive members are adhered to the upper substrate corresponding to the first, second, third, and fourth peripheral areas, the side walls and corresponding portions of the first and the second side brackets.

25. The information processing device of claim 21, further comprising a wire disposed between the rear housing and the first side bracket,
wherein the wire transmits signals received from the exterior to the display panel unit.

26. The information processing device of claim 25, wherein a guide recess is formed on the rear housing to guide the wire.

27. A display device, comprising:
a display module comprising:
a backlight unit for emitting light; and
a display panel unit disposed on the backlight unit;
a supporting frame supporting a side face of the display module; and
a protection member disposed between the side face of the display module and the supporting frame,
wherein the display panel unit includes a first side face, and
wherein the protection member includes a first portion facing the first side face of the display panel unit.

28. The display device of claim 27, wherein the protection member comprises a cushion for shock absorption.

29. The display device of claim 28, further comprises a fixing frame including a portion facing a rear face of the display module,
wherein the fixing frame fixes the display module to the supporting frame.

30. The display device of claim 27, wherein the first portion of the protection member directly faces the first side face of the display panel unit.

31. The display device of claim 27, wherein the display panel unit comprises:
a first substrate;
a second substrate facing the first substrate; and
a liquid crystal layer disposed between the first and second substrates.

* * * * *